United States Patent [19]

Takeuchi

[11] Patent Number: 5,379,958
[45] Date of Patent: * Jan. 10, 1995

[54] FISHLINE GUIDE MECHANISM IN SPINNING REEL FOR FISHING

[75] Inventor: Shinji Takeuchi, Tokyo, Japan

[73] Assignee: Daiwa Seiko, Inc., Tokyo, Japan

[ * ] Notice: The portion of the term of this patent subsequent to Mar. 16, 2010 has been disclaimed.

[21] Appl. No.: 960,103

[22] Filed: Oct. 13, 1992

Related U.S. Application Data

[63] Continuation-in-part of Ser. No. 696,560, May 9, 1991, Pat. No. 5,193,762.

[30] Foreign Application Priority Data

May 11, 1990 [JP] Japan ................................. 2-48589
May 25, 1990 [JP] Japan ................................. 2-54117

[51] Int. Cl.$^6$ ............................................. A01K 89/01
[52] U.S. Cl. ..................................... 242/232; 242/319
[58] Field of Search ............... 242/230, 231, 232, 233, 242/319

[56] References Cited

U.S. PATENT DOCUMENTS 4,403,750  9/1983  Morimoto .................. 242/232
4,427,161  1/1984  Sakumoto .................. 242/233
4,463,915  8/1984  Kaneko ..................... 242/232
4,527,752  7/1985  Maruyama et al. .......... 242/232
5,004,182  4/1991  Councilman ................ 242/232
5,022,605  6/1991  Carlsson ................... 242/233
5,193,762  3/1993  Takeuchi ................... 242/232

FOREIGN PATENT DOCUMENTS 44-16703  7/1969  Japan .
59-139069 9/1984  Japan .

Primary Examiner—Daniel P. Stodola
Assistant Examiner—Michael R. Manson
Attorney, Agent, or Firm—Longacre & White

[57] ABSTRACT

A fishline guide mechanism in a spinning reel for fishing, includes: a bail attaching arm provided to a rotor; a bail supporting member pivotally coupled to an end portion of the bail attaching arm so as to invert from one of a fishline releasing position and a fishline winding position to the other of a fishline releasing position and a fishline winding position; and an anti-tangling member provided and bridged between the bail supporting member and the bail attaching arm. A fishline can be surely prevented from being tangled on any step and/or gap formed between the bail attaching arm and the bail supporting member below the anti-tangling member.

5 Claims, 9 Drawing Sheets

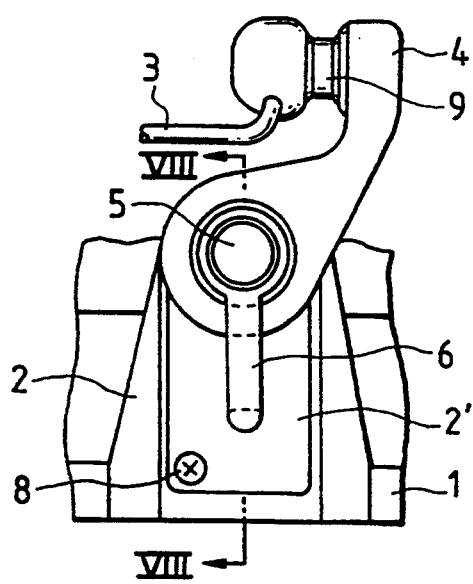
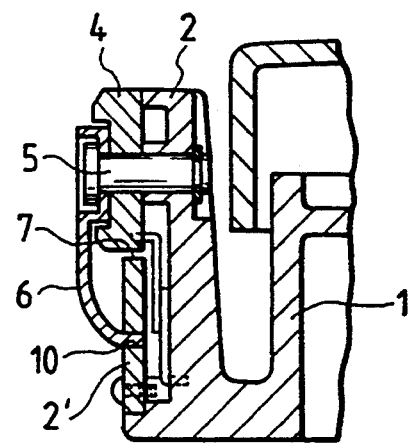
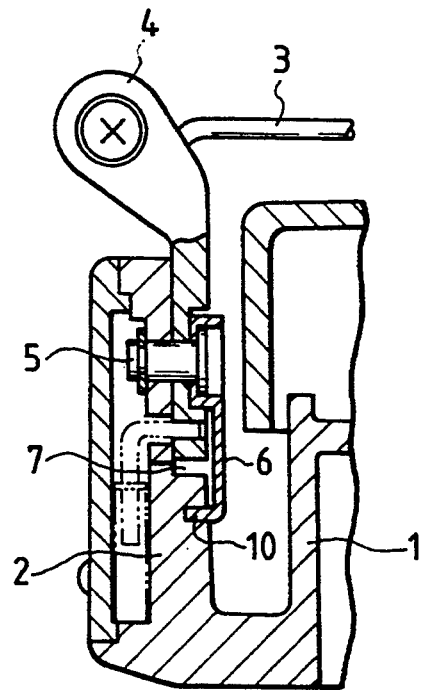

FISHLINE GUIDE MECHANISM IN SPINNING REEL FOR FISHING

This is a continuation in part of application Ser. No. 07/696,560, filed May 9, 1991, now U.S. Pat. No. 5,193762.

BACKGROUND OF THE INVENTION

The present invention relates to an improved fishline guide mechanism in a spinning reel for fishing.

It has been disclosed in the Japanese Utility Model Unexamined Publication No. Sho. 59-139069 that a bail supporting member is pivotally coupled to an end portion of a bail attaching arm of a rotor so as to invert from one of the fishline releasing position and the fishline winding position to the other of them.

However, since a bail supporting member has a gap between the attaching arm and a peripheral edge of an attaching shaft which is provided for pivotally coupling a bail supporting member to the bail attaching arm, the mechanism has a problem that a fishline is accidentally guided into the gap and twines around the fishline guide unit due to the influence of wind or wave at the time of fishing, or the loosening of the fishline or the twisting habit thereof, thereby becoming incapable of being wound, or cutting off or damaging the fishline.

It has been disclosed in the Japanese Utility Model Examined Publication No. Sho. 44-16703 that a bail supporting member having a fishline guide portion is supported to the inside of a bail attaching arm of a rotor. The mechanism, in which the bail supporting member is supported to the inside of the bail attaching arm, has the advantages that the winding operation can be performed smoothly and safely and the reel construction can be small in size because the bail supporting arm is located away from fingers holding a fishing rod. However, since the end portion of the bail supporting member is extended outwardly with respect to an outer side surface of the end of the bail attaching arm so that a height difference wall is formed therebetween, the mechanism has a problem that a fishline twines around the height difference wall due to the influence of wind or wave at the time of fishing, or the loosening of the fishline or the twisting habit thereof at the time of winding of the fishline, thereby becoming incapable of being wound, or cutting off or damaging the fishline.

SUMMARY OF THE INVENTION

The present invention was made in order to solve the problems mentioned above.

Accordingly, it is an object of the present invention to provide a fishline guide mechanism which is in a spinning reel for fishing and operates so that a fishline is prevented from tangling on any of the bail attaching arm or the bail supporting member.

In order to attain the above-noted and other objects, the present invention provides a fishline guide mechanism in a spinning reel for fishing, which comprises: a bail attaching arm provided to a rotor, the rotor having an axis of rotation; a bail supporting member pivotally coupled to an end portion of the bail attaching arm by an attaching shaft so as to invert from one of a fishline releasing position and a fishline winding position to the other of a fishline releasing position and a fishline winding position; and an anti-tangling member bridged between the bail supporting member and the bail attaching arm.

Preferably, the bail supporting member has a first surface coupled to the end portion of the bail attaching arm and a second surface opposite to the first surface, and one end of the anti-tangling member overlies the second surface.

The bail supporting member may be formed with an arcuate recess to receive one end of the anti-tangling member therein.

The bail supporting member and the attaching shaft may be formed as one-piece member.

The one end of the anti-tangling member may be positioned on the bail supporting member offset from an axial end of the attaching shaft.

According to the present invention, the anti-tangling member is provided to the reel mechanism so that a fishline is prevented from tangling on the fishline guide portion due to the influence of wind or wave at the time of fishing, or the twisting habit of the fishline or loosing thereof at the time of winding of the fishline, thereby winding the fishline smoothly.

In addition, since the gap formed between the peripheral edge of the attaching shaft and the bail attaching arm is covered to protect with the anti-tangling member, the fishline is prevented from cutting off or damaging, thereby performing the winding operation easily, smoothly and safely.

Further, since the bail supporting member can be attached to the inside wall of the bail attaching arm, the reel construction can be small in size.

BRIEF DESCRIPTION OF THE DRAWINGS

FIGS. 5, 6 and 7 are front views showing a main part of yet another embodiments of the present invention, respectively;

FIG. 8 is a section taken along a line C—C of FIG. 7;

FIG. 9 is a sectional view showing a main part of yet another embodiment of the present invention;

DETAILED DESCRIPTION OF THE PREFERRED EMBODIMENTS

Embodiments of the present invention are hereafter described in detail with reference to the drawings attached hereto.

Figure 1:
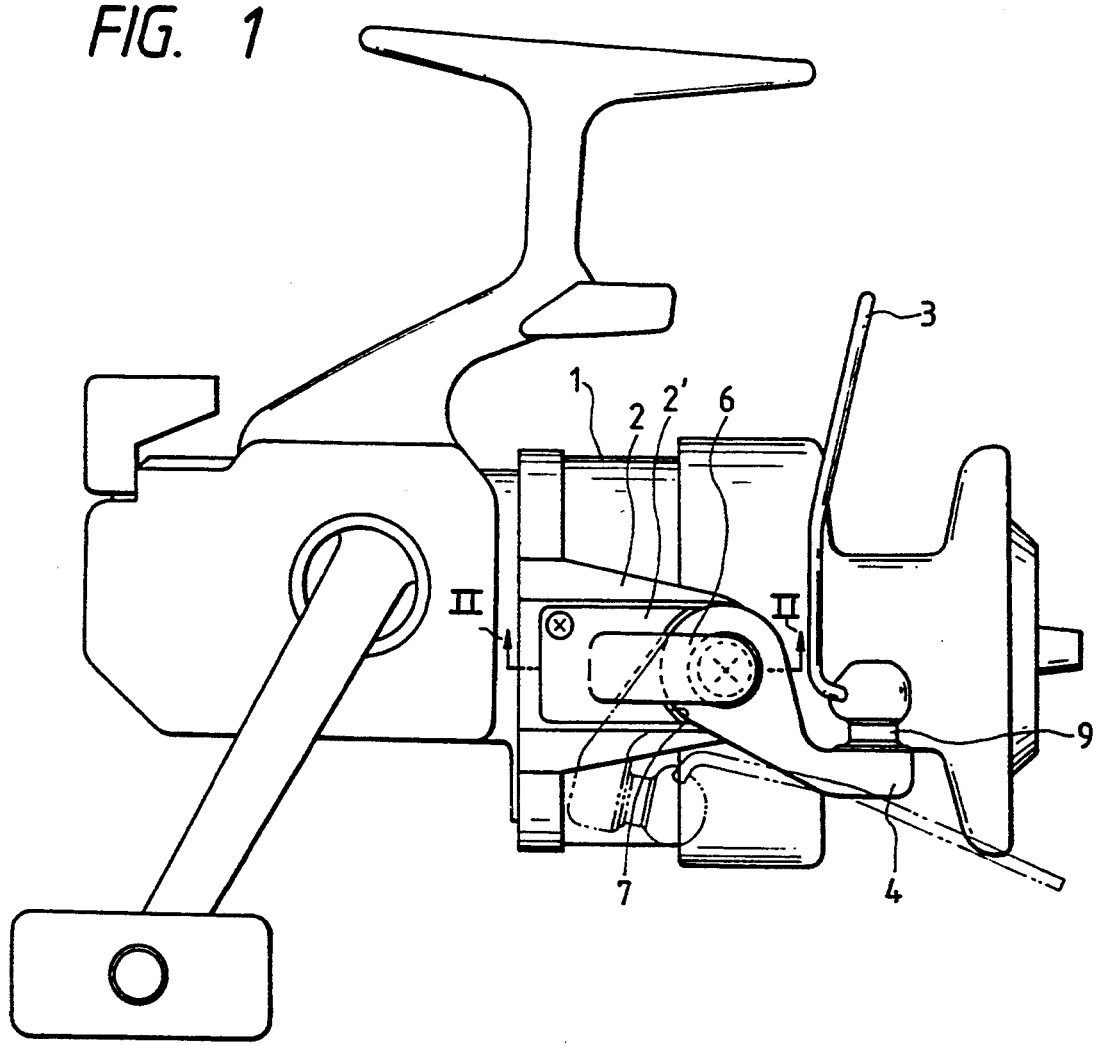
FIG. 1 is a front view of a spinning reel which is an embodiment of the present invention.
Figure 2:
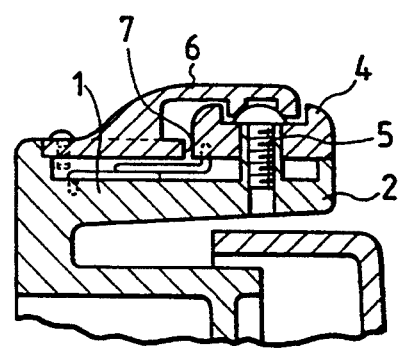
FIG. 2 is a section taken along a line A—A of FIG. 1.

FIGS. 1 and 2 show a spinning reel for fishing which is one of the embodiments.

In the spinning reel, as shown in FIG. 1, bail attaching arms are provided on both sides of a rotor 1. A bail 3 is provided on and fixed to the first end portion of a bail supporting member 4. The second end portion of the bail supporting member 4 is pivotally coupled to an outer end of a bail attaching arm 2 by an attaching shaft 5 so that the bail 3 can be supported in the fishline winding position shown by the solid line or the fishline releasing position shown by the two dot and dash line. A cover plate 2' is provided on an outer surface of a base portion of the bail attaching arm 2. The cover plate 2' is integrally formed with an anti-tangling member 6 whose distal end is fittingly secured to the outside second end portion of the bail supporting member 4 and is coaxially disposed on the attaching shaft 5. Therefore, a gap 7 formed between the cover plate 2' and the peripheral edge of the second end portion of the bail supporting member 4 is covered with the anti-tangling member 6. Further, since the anti-tangling member 6 is bridged between the bail attaching arm 2 and the bail supporting member 4, a fishline is prevented from being tangled on a step formed there between.

Figure 3:
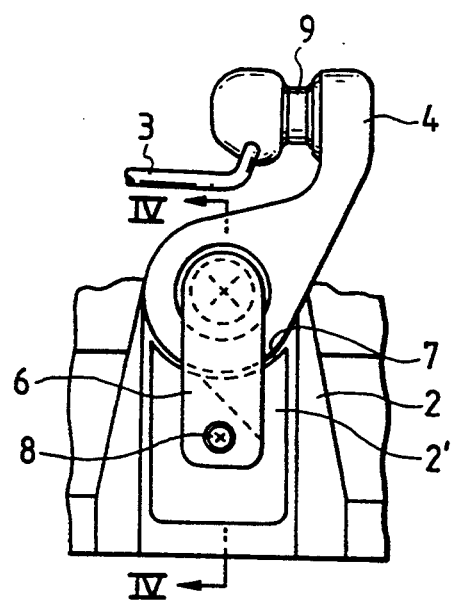
FIG. 3 is a front view showing a main part of another embodiment of the present invention.
Figure 4:
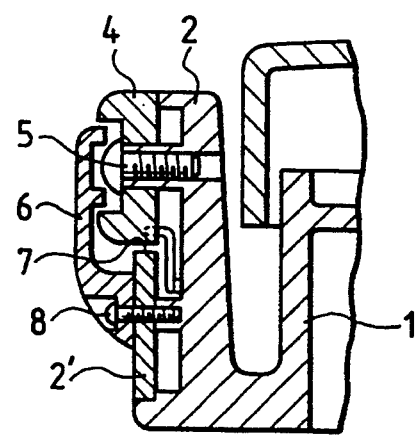
FIG. 4 is a section taken along a line B—B of FIG. 3.

FIGS. 3 and 4 show the second embodiment of the present invention in which the anti-tangling member 6 is separately formed from the cover plate 2' and fixedly secured to the cover plate 2' by a screw 8.

Figure 5:
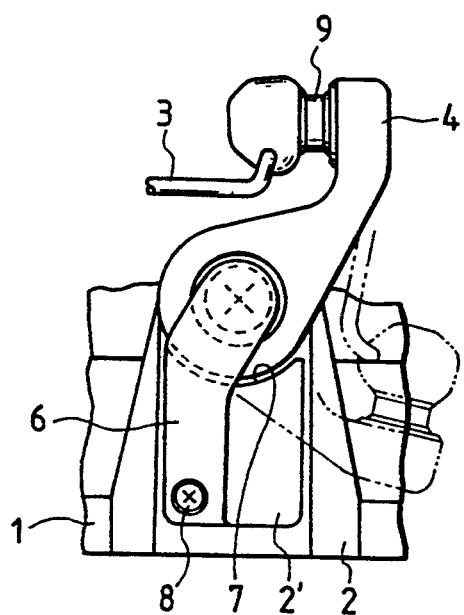

FIG. 5 shows the third embodiment of the present invention in which the anti-tangling member 6 is fixedly secured to the cover plate 2' by the screw 8 in such a manner that the fixing end of the anti-tangling member 6 is offset from a center of the cover plate 2'.

Figure 6:
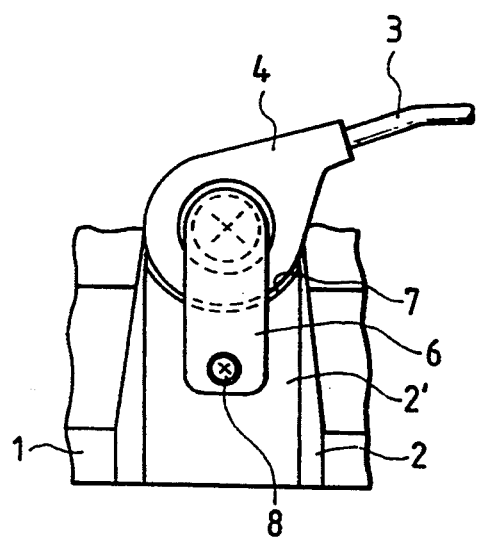

FIG. 6 shows the fourth embodiment in which the anti-tangling member 6 of the present invention is applied to a bail supporting member 4 other than that shown in FIG. 1, the bail supporting member 4 supporting the other end of the bail 3 and not having a line roller 9.

FIGS. 7 and 8 show the fifth embodiment of the present invention in which a base end portion of the anti-tangling member 6 is fittingly supported through a small hole 10 to the cover plate 2' of the bail attaching arm 2, and the other end portion thereof is secured to the bail supporting member 4 through the attaching shaft 5.

Further, FIG. 9 shows the sixth embodiment of the present invention in which the bail supporting member 4 is pivotally coupled to an inside end portion of the bail attaching arm 2 by the attaching shaft 5. The anti-tangling member 6 is bridged between the inside end portion of the bail 1 attaching arm 2 and the bail supporting member 4. In addition, the base end portion of the anti-tangling member 6 is fittingly supported through the small hole 10 onto the inside base portion of the bail attaching arm 2, and the other end portion thereof is secured to the inside wall of the bail supporting member 4 through the attaching shaft 5.

Accordingly, in these embodiments, the gap 7 formed between the bail attaching arm 2 and the peripheral edge portion of the bail supporting member 4 pivotally secured to the bail attaching arm 2 is surely covered by the anti-tangling member 6 to prevent the fishline from being erroneously guided in the gap 7 due to the influence of the wind or wave at the time of fishing, or the twisting habit of the fishline or the loosening thereof. Further, since the anti-tangling member 6 overlies from the bail attaching arm 2 to the bail supporting member 4, the fishline can be surely prevented from being tangled on any step formed between the bail attaching arm 2 and the bail supporting member 4 below the anti-tangling member 6.

Figure 10:
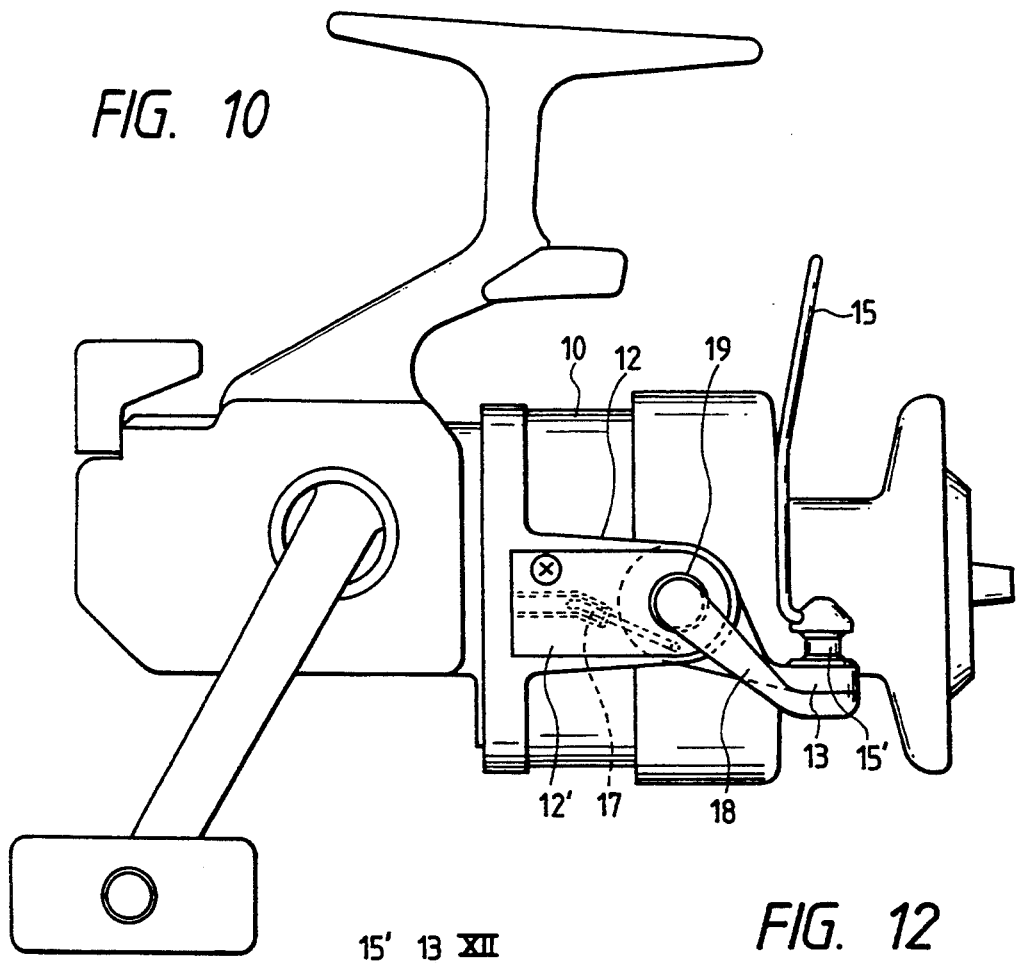
FIG. 10 is a front view of a spinning reel which is yet another embodiment of the present invention.
Figure 11:
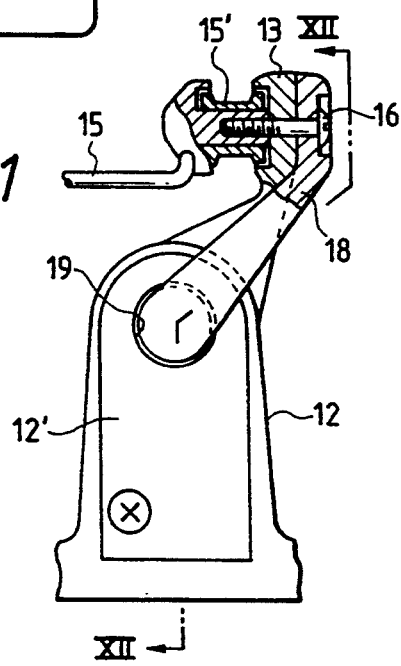
FIG. 11 is a partially broken front view showing a main part of a spinning reel shown in FIG. 10.
Figure 12:
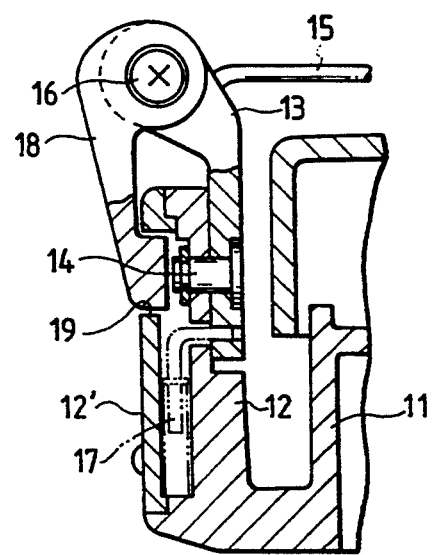
FIG. 12 is a section taken along a line D—D of FIG. 11.

FIGS. 10–12 show the seventh embodiment of the present invention. In this embodiment, the first end of a bail support member 13 is pivotally coupled through a support shaft 14 to the inside end portion of a bail attaching arm 12 provided on a rotor 11 in the spinning reel. A cover plate 12' is provided on an outer surface of the bail attaching arm 12. In addition, a bail 15 having a fishline guide portion 15' such as a roller is fixedly secured to the second end of the bail support member 13 by an attaching shaft 16. In addition, the bail 15 can be held in the fishline winding position or the fishline releasing position by means of a bail distribution mechanism 17.

One end of an anti-tangling member 18 is fixedly secured to the second end of the bail supporting member 13 and on the opposite side to the attaching portion of the bail 15 by the attaching shaft 16. In addition, the other end of the anti-tangling member 18 is fittingly secured to an engagement hole 19 formed on the cover 12' and is coaxially provided relative to the support shaft 14. Specifically, the other end of the anti-tangling member 18 is fittingly secured on the supporting portion where the bail supporting member 13 is supported to the bail attaching arm 12 by the support shaft 14, through the engagement hole 19.

Figure 13:
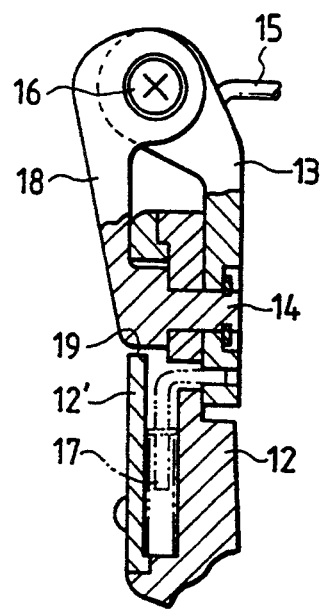
FIG. 13 is a sectional view showing a main part of yet another embodiment of the present invention.

FIG. 13 shows the eighth embodiment of the present invention in which a support shaft 14 for supporting the bail support member 13 is integral with the anti-tangling member 18 so that one end portion of the anti-tangling member 8, which is fitted to the engagement hole 19, supports the bail supporting member 13 onto the bail attaching arms 12.

Figure 14:
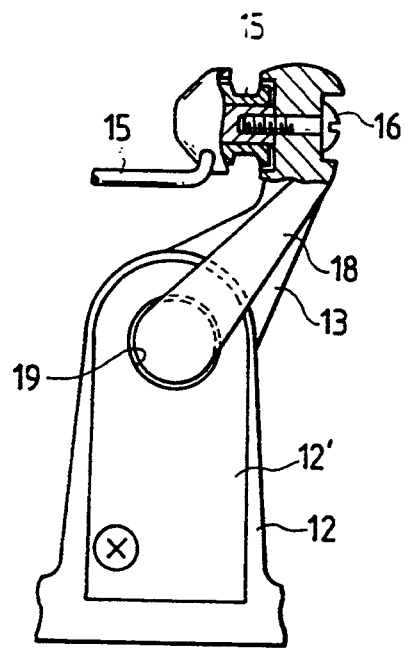
FIG. 14 is a partially broken front view showing a main part of yet another embodiment of the present invention.
Figure 15:
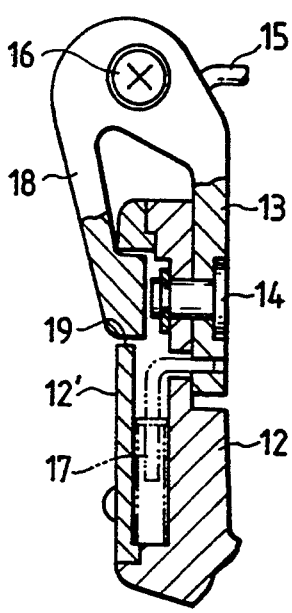
FIG. 15 is a sectional view of the embodiment shown in FIG. 14.

FIGS. 14 and 15 show the ninth embodiment of the present invention in which the anti-tangling member 18 is formed integrally with and made of the same material as the bail support member 13.

Figure 16:
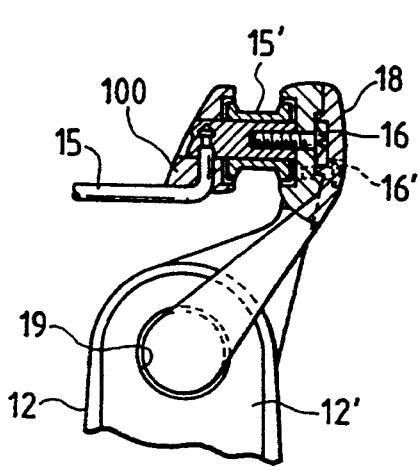
FIG. 16 is a partially broken front view showing a main part of yet another embodiment of the present invention.
Figure 17:
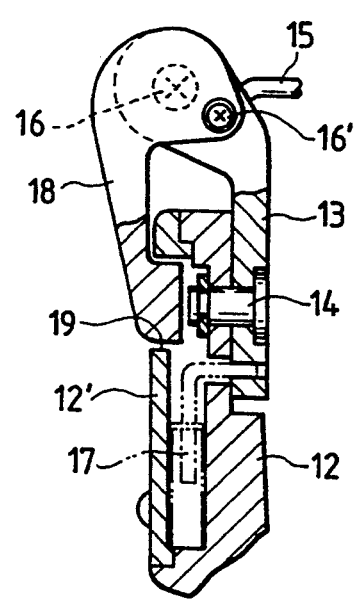
FIG. 17 is a sectional view of the embodiment shown in FIG. 16.

Further, FIGS. 16 and 17 show the tenth embodiment of the present invention in which the anti-tangling member 18 is fixedly secured to the end of the bail supporting member 13 by a screw 16' which is separate component from the attach shaft 16. In this embodiment, a bail attaching portion 100 is gradually increased from the bail 5 toward a fishing guide portion 5' so that a fishline is prevented from tangling on the bail attaching portion.

Therefore, a fishline is prevented from tangling on the end portion of the bail supporting member 3 due to the influence of wind or wave at the time of fishing, or the twisting habit of the fishline or loosing thereof at the time of winding of the fishline, thereby winding fishline smoothly.

Figure 18:
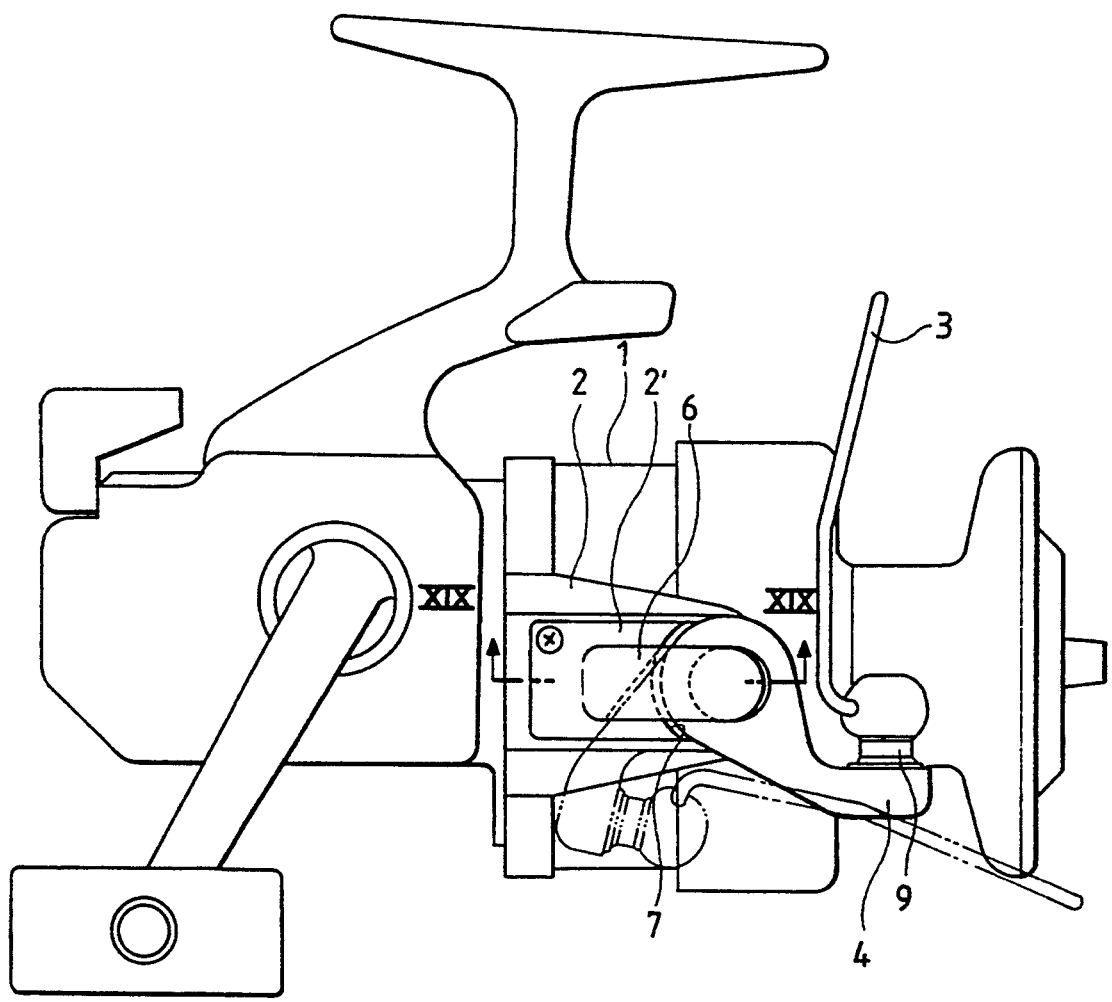
FIG. 18 is a front view of a spinning reel which is still another embodiment of the present invention.
Figure 19:
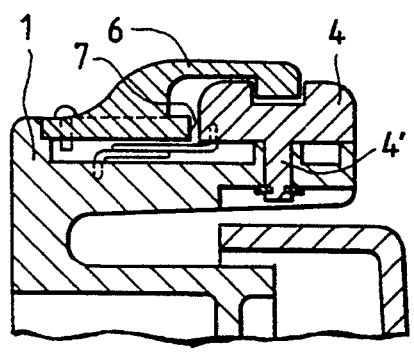
FIG. 19 is a sectional view taken along a line E—E of FIG. 18.

FIGS. 18 and 19 show the eleventh embodiment of the present invention. In this embodiment, the bail supporting member 4 is formed with an integral attaching shaft 4' through which the bail supporting member 4 is pivotably supported onto the bail attaching arm 2 of the rotor 1. One end of the anti-tangling member 6 overlies and covers a portion of the anti-tangling member 4, which corresponds to an axial end of the integral attaching shaft 4'. The gap 7 formed between the bail attaching arm 2 and the peripheral edge portion of the bail supporting member 4 pivotally secured to the bail attaching arm 2 is surely covered by the anti-tangling member 6 to prevent the fishline from being erroneously guided in the gap 7 due to the influence of the wind or wave at the time of fishing, or the twisting habit of the fishline or the loosening thereof. Further, since the anti-tangling member 6 overlies from the bail attaching arm 2 to the bail supporting member 4, the fishline can be surely prevented from being tangled on any step formed between the bail attaching arm 2 and the bail supporting member 4 below the anti-tangling member 6.

Figure 20:
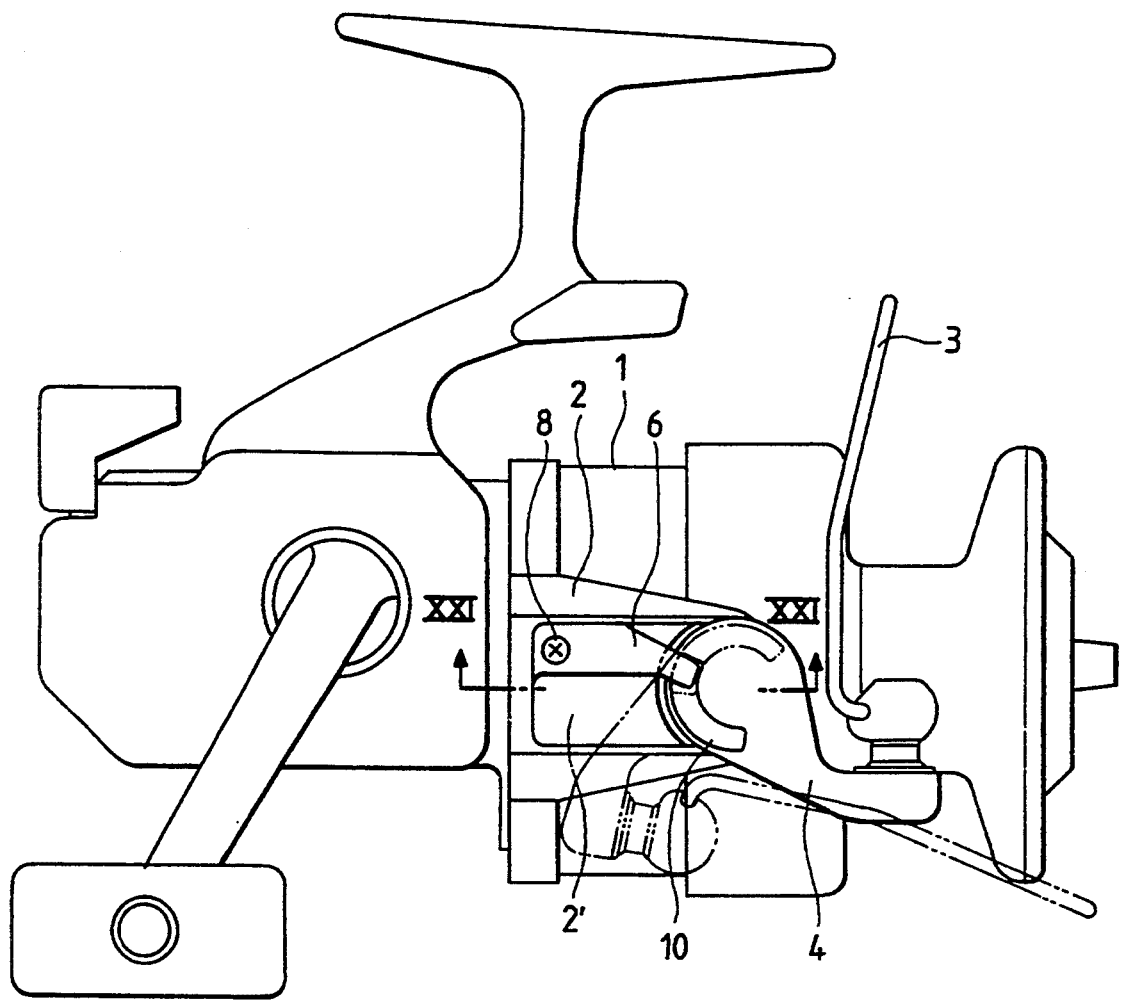
FIG. 20 is a front view of a spinning reel which is further another embodiment of the present invention.
Figure 21:
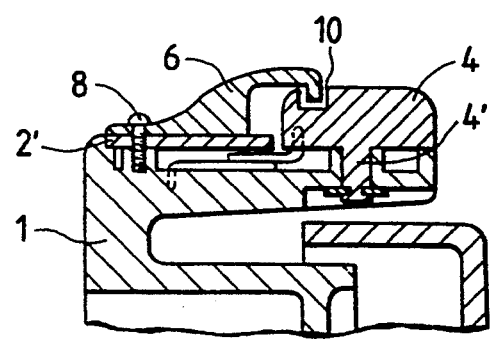
FIG. 21 is a sectional view taken along line F—F in FIG. 20.

FIGS. 20 and 21 show the twelfth embodiment of the present invention. In this embodiment, one end of the anti-tangling member 6 is securely fixed to the bail attaching arm 2 of the rotor 1 by the screw 8 with the cover plate 2' interposed therebetween, the one end being positioned offset from a center of the cover plate 2'. The other end of the anti-tangling member 6 is positioned offset from the axial end of the integral attaching shaft 4' and received in a arcuate recess 10 formed in the outside portion of the bail supporting member 4 so as to allow the pivot motion of the bail supporting member 4. The end of the anti-tangling member 6, which received in the arcuate recess 10 may be used for regulating the pivot motion of the bail supporting arm 4.

Figure 22:
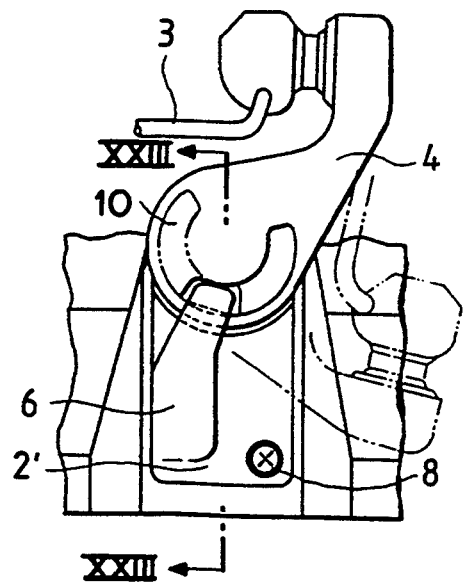
FIG. 22 is a front view showing a major part of a modified one of the embodiment shown in FIGS. 20 and 21.
Figure 23:
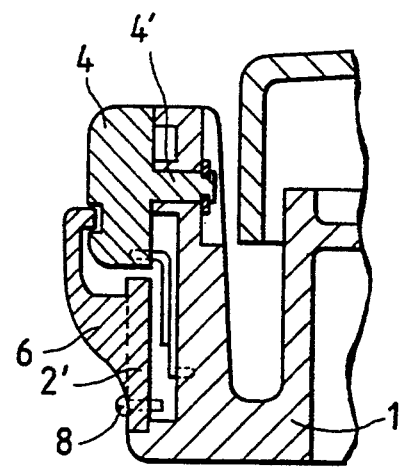
FIG. 23 is a sectional view taken along line G—G in FIG. 22.

FIGS. 22 and 23 show a modified one of the twelfth embodiment, in which the anti-tangling member 6 and the cover plate 2' are integrally molded to form one-piece member.

Figure 24:
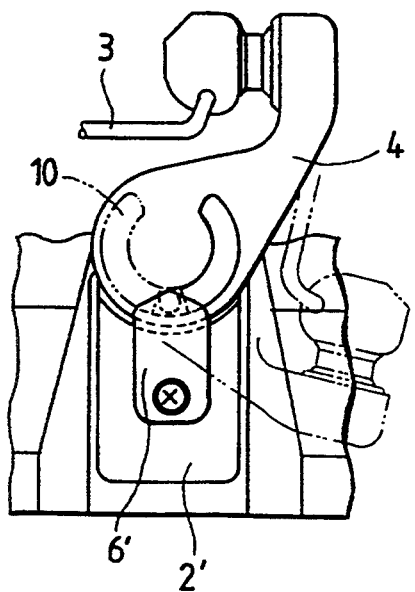
FIG. 24 is a front view showing a major part of another modified one of the embodiment shown in FIGS. 20 and 21.

FIG. 24 show another modified one of the twelfth embodiment, in which the configuration of the anti-tangling member 6 is modified.

Figure 25:
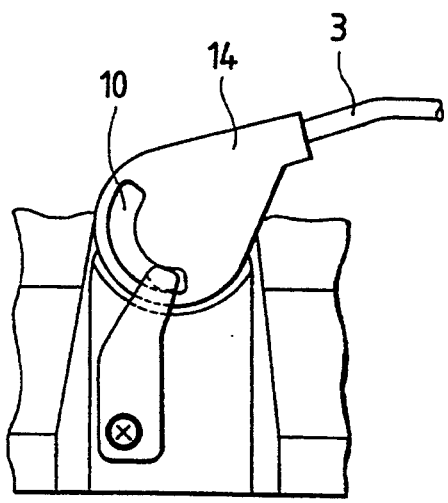
FIG. 25 is a front view showing a major part of an embodiment in which anti-tangling member and recess arrangement of the embodiment shown in FIGS. 20 and 21 is applied to other opposite bail supporting member.

FIG. 25 show the thirteenth embodiment of the present invention, in which the arrangement of the anti-tangling member 6 and the arcuate recess 10 is applied to a bail supporting member 14 which supports other end of the bail 3.

Figure 26:
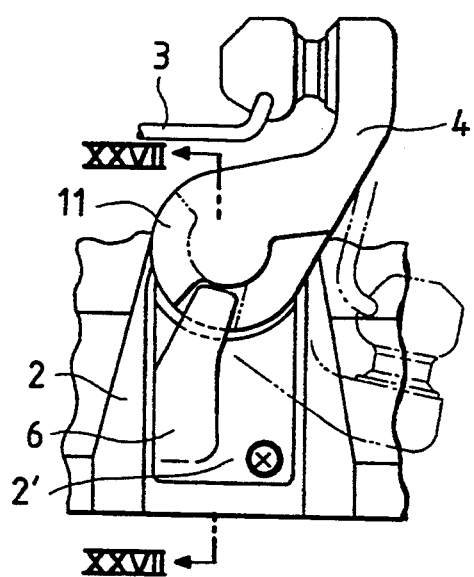
FIG. 26 is a front view showing a major part of still modified one of the embodiment shown in FIGS. 20 and 21.
Figure 27:
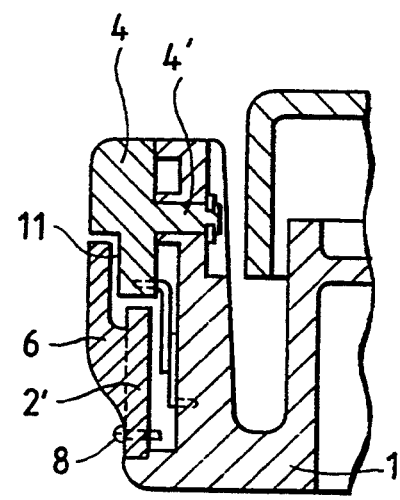
FIG. 27 is a sectional view taken along line H—H in FIG. 26.

FIG. 26 and 27 show the fourteenth embodiment of the present invention. In stead of the arcuate recess 10 in the twelfth embodiment, a substantially arcuate notched portion 11 is formed along outer periphery of the bail supporting member 4. A distal end of the anti-tangling member 6 formed integrally on the cover plate 2' overlies a surface of the notched portion 11 of the bail supporting member 4 so that the distal end is consecutive to a portion of the bail supporting member, which corresponds to the axial end of the integral attaching shaft 4'. Therefore, a fishline is guided from the bail attaching arm 2 to the bail supporting member 4 without any tangling.

According to the present invention, the gap 7 formed between the bail attaching arm 2 and the peripheral edge portion of the bail supporting member 4 pivotally secured to the bail attaching arm 2 is surely covered by the anti-tangling member 6 to prevent the fishline from being erroneously guided in the gap 7 due to the influence of the wind or wave at the time of fishing, or the twisting habit of the fishline or the loosening thereof. Further, since the anti-tangling member 6 overlies from the bail attaching arm 2 to the bail supporting member 4, the fishline can be surely prevented from being tangled on any step and/or gap formed between the bail attaching arm 2 and the bail supporting member 4 below the anti-tangling member 6.

The present invention is not confined to the embodiments described above, but may be embodied or practiced in other various ways without departing the spirits or essential of the invention.

What is claimed is:

1. A fishline guide mechanism in a spinning reel for fishing, comprising:
    a bail attaching arm provided on a rotor, said rotor having an axis of rotation;
    a bail supporting member having a first end attached to a bail and a second end pivotally coupled to an end portion of said bail attaching arm by an attaching shaft so as to invert from one of a fishline releasing position and a fishline winding position to the other of a fishline releasing position and a fishline winding position; and
    an anti-tangling member bridged between said bail supporting member and said bail attaching arm, said anti-tangling member is fixed with respect to said bail attaching arm and extends radially outward to at least a peripheral portion with respect to said axis of rotation of said second end of said bail support member.

2. The fishline guide mechanism according to claim 1, wherein said bail supporting member has a first surface coupled to the end portion of said bail attaching arm and a second surface opposite to said first surface, and one end of said anti-tangling member overlies said second surface.

3. The fishline guide mechanism according to claim 1, wherein said bail supporting member is formed with an arcuate recess which receive one end of said anti-tangling member therein.

4. The fishline guide mechanism according to claim 1, wherein said bail supporting member and said attaching shaft is formed as one-piece member.

5. The fishline guide mechanism according to claim 1, wherein one end of said anti-tangling member is positioned on said bail supporting member offset from an axial end of said attaching shaft.

* * * * *